Patented Jan. 12, 1943

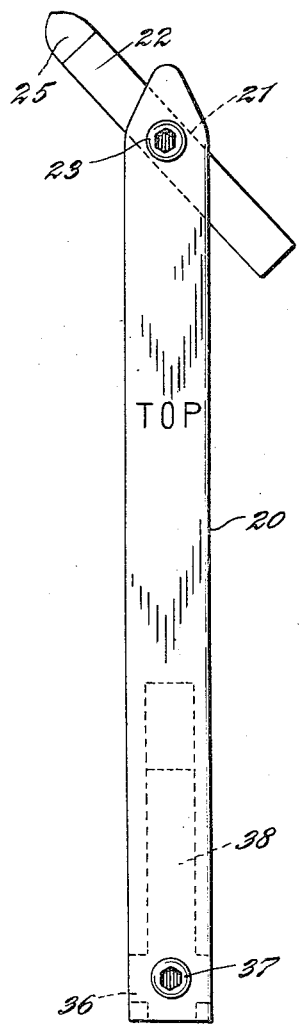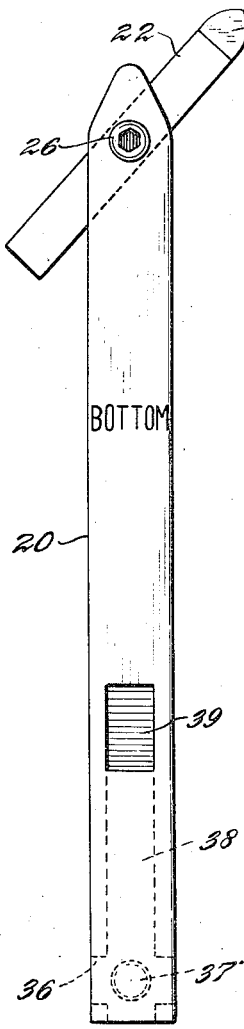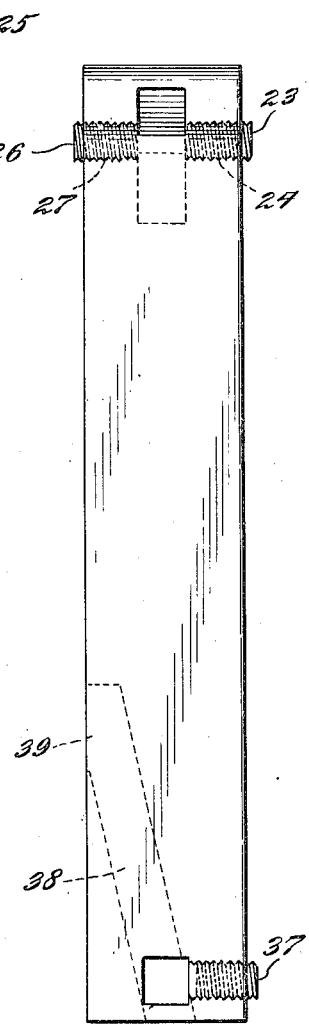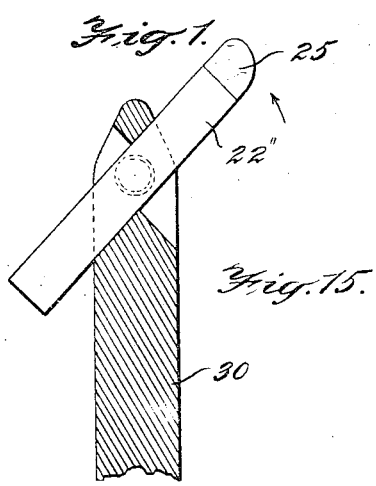

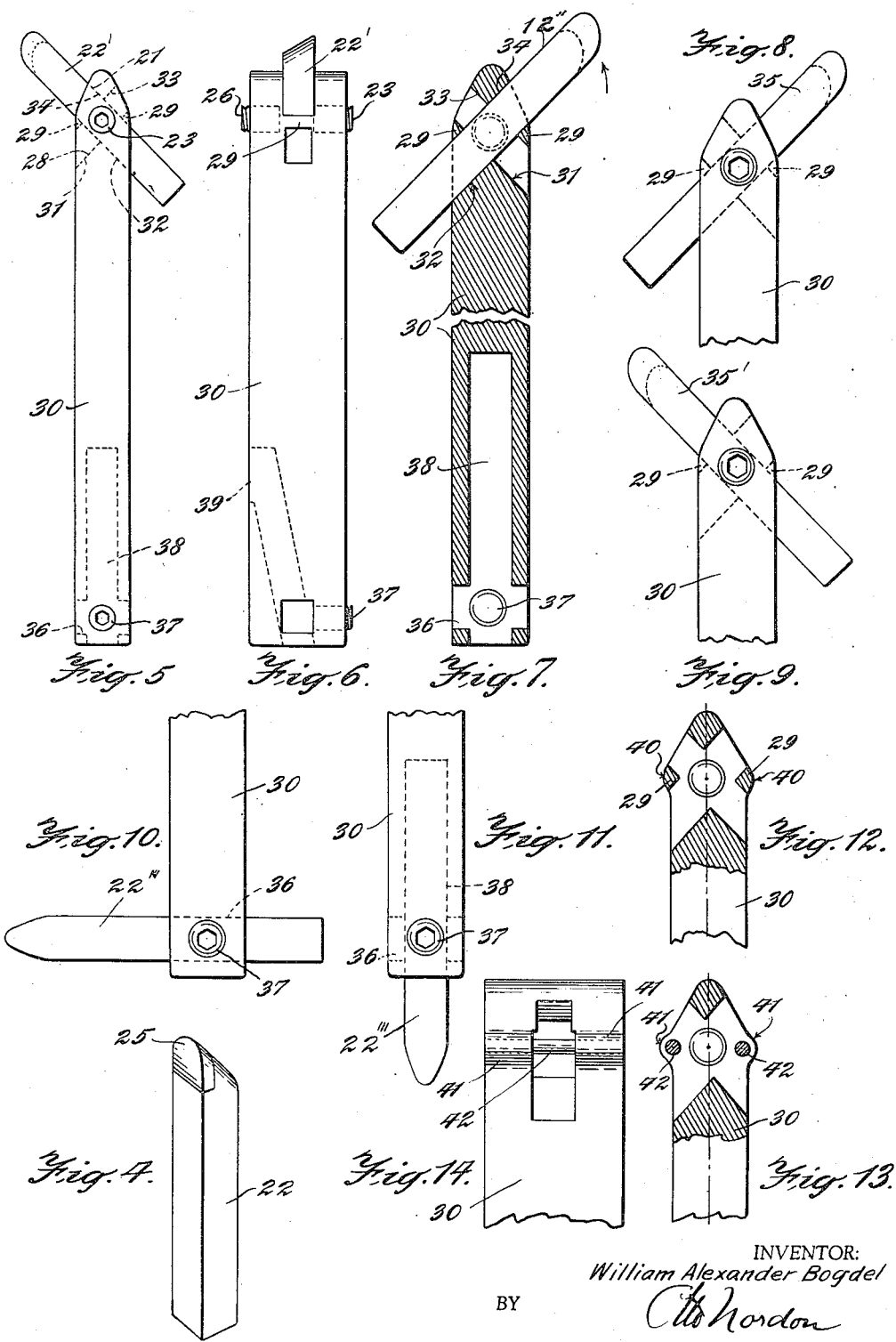

2,308,151

UNITED STATES PATENT OFFICE 2,308,151

SIX-IN-ONE CARBIDE TOOL HOLDER

William Alexander Bogdel, New York, N. Y.

Application June 17, 1941, Serial No. 398,371

4 Claims. (Cl. 29—96)

This invention relates to new and useful improvements in tool holders adapted especially for lathe work.

Cutters, bits, and similar tools are customarily supported by holders. These tool holders are inserted between the jaws of the tool post of the lathe to which they are secured by means of a screw or the like. The lathe revolves the work piece and the tool bearing against the work piece works it in the desired manner.

A secure and rigid support for the tool is, therefore, of great importance. This importance becomes paramount in the case of carbide steel cutters.

An object of the present invention is to construct a tool holder which is primarily adapted for carbide cutters. An example of a carbide cutter is the tool known by the commercial name "Carboloy."

Ordinary tool holders have the disadvantage that they are constructed either for right hand work only or for left hand work only or for straight work only.

It is an object of the present invention to provide a tool holder which may be used for right hand work and left hand work and straight work.

A further object of my invention is to construct a tool holder which, in addition to the foregoing advantages, is adapted to receive cutters of different sizes. Moreover, the tool holder according to the invention is adapted to support cutters in six different positions and I, therefore, call it the six-in-one tool holder.

These and other advantages will become more apparent from the following description and the accompanying drawings which illustrate my invention by way of example.

In the drawings—

Fig. 1 is a top plan view of my new tool holder in right hand position;

Fig. 2 is a top plan view of the same tool holder in left hand position;

Fig. 3 is a side elevation of the tool holder shown in Figs. 1 and 2.

Fig. 4 is a perspective view of a "Carboloy" type cutter tool.

Fig. 5 shows in top plan view my new tool holder with two tool receiving channels of different size, a large cutter tool being shown in right hand position;

Fig. 6 is a side elevation of the device according to Fig. 5;

Fig. 7 is a sectional view of the tool holder shown in Fig. 5, with a large size cutter tool in left hand position;

Fig. 8 illustrates the same tool holder as Fig. 5 with a small size cutter in left hand position;

Fig. 9 illustrates the same tool holder as Fig. 5 with a small size cutter in right hand position;

Fig. 10 illustrates the lower end of the tool holder shown in Fig. 5 with a horizontally disposed cutter.

Fig. 11 illustrates the lower end of the tool holder shown in Fig. 5 with a perpendicularly disposed cutter;

Fig. 12 is a sectional detail view of a modification of the invention comprising a re-enforced tip;

Fig. 13 is a sectional detail view of a further modification provided with replaceable pins for supporting the cutter;

Fig. 14 is a side elevation of the device shown in Fig. 13;

Fig. 15 illustrates a further modified form of the holder in which the bridge pieces are omitted.

Referring to Figs. 1 to 3 of the accompanying drawings, it will be noted that the tool holder 20 consists of a substantially flat body which is tapered at one end to form a tip. A channel 21 is provided in the tip portion of tool holder 20.

Channel 21 is inclined about 43° with respect to the longitudinal center line of tool holder 20 and serves to receive a cutter 22. If desired, the inclination of channel 21 may, of course, be 45°, although I prefer for the present tool holder a channel inclination of slightly less than 45°. Cutter tool 22 is secured to tool holder 20 by means of screw 23 which turns in bore 24. The latter extends from the "top" face of tool holder 20 to channel 21. Thus, when tool holder 20 is inserted in the tool post of the lathe, with the "top" face in upward position, cutter 22 may be fastened or loosened by turning screw 23.

Cutter 22 may be constructed as shown in Fig. 4, or it may be given any other shape of cutting edge desired. Preferably, cutter 22 is provided with a hard carbide metal edge 25. The latter consists, for instance, of "Carboloy," and is braced or otherwise secured to element 22. The "Carboloy" cutting edge 25 forms the foremost upper part of the tool. In the position shown in Fig. 1, holder 20 with cutter 22 (edge 25) presents a "right hand tool holder." If it is desired to transform the tool holder 20 and cutter 22 shown in Fig. 1 into a "left hand tool holder," the holder 20 is turned 180° to bring the "bottom" face up as shown in Fig. 2. After the holder 20 is thus reversed, the cutter 22 is removed and re-inserted so as to place the "Carboloy" cutting edge at the foremost upper part of tool 22. It is necessary to re-insert cutter 22 after reversal because if that were not done, the "Carboloy" cutting edge 25 would form the lower edge of cutter 22 which would render it unsuitable for lathe work.

In the "left hand" position shown in Fig. 2, the cutter 22 is secured to the holder by means of screw 26 which extends through bore 27 in the tip of the tool holder 20. The device is so dimensioned, that the cutter 22 is held in place but by a single screw, namely either screw 23 or 26. It is always the screw which faces upward which is used for locking the cutter 22. This is important when the tool holder is in the tool post as it is then no longer feasible to tighten the screw from below. On the other hand it would not be practical to remove the holder from the tool post merely for tightening the screw for each adjustment of the cutter, because considerable time and great care and accuracy are required for proper positioning of the holder in the tool post.

These difficulties are overcome by the present invention which uses two set screws 23, 26 which make it possible to secure cutter 22 from above, in either the "top" or "bottom" position of the tool holder 20.

Moreover, screws 23, 26 are so dimensioned that they project but slightly over the "top" and "bottom" faces of holder 20. Due to this construction, the tool holder according to the invention fits easily into standard tool posts.

As mentioned above, tool holder 20 according to Fig. 1 is provided at its tip with a single tool receiving channel 21.

In contrast thereto, the tool holder 30 according to Figs. 5 to 11 is provided at its tip with two tool receiving channels 21, 28. The two channels are of different size to accommodate different tools. Channel 21 may for instance be dimensioned to receive a ⅜ inch cutter, while channel 28 accommodates a 5/16 inch cutter. Channels 21 and 28 cross each other and form at the tip of the tool holder 30 an angle which is preferable slightly less than 90°, being for instance 86°, each channel being thus inclined 43° with respect to the longitudinal axis of the tool holder.

As a result of the crossing channels 21, 28, two bridge pieces 29 are formed having triangular transverse sections as shown in Figs. 5, 7, 8 and 9.

I discovered that it is wholly unnecessary to construct the holder with an enlarged square head or bulky supporting members for steady carriage of the tool. The present tool holder is so constructed that all pressure exerted on the tool during the lathe operation is taken up by the inclined walls 31, 32, 33, 34 of channels 21, 28. It will be noted that little or no pressure is exerted on bridge pieces 29, because the pressure acts substantially in the direction of the arrow shown in Fig. 7. The present invention therefore includes a construction which altogether omits bridge pieces 29, the tool 22 for instance being supported exclusively by the channel walls 31, 33, or 32, 34, and screw 23 or 26, depending on the position of the holder. Due to this discovery, it has been possible for the first time to give a universal tool holder "streamlined" contours. This is important, because the slender, tapering tip of the new tool holder illustrated in Figs. 1 to 11 makes it possible to bring the tool holder very near to the work piece and to get at corners and crevices inaccessible to ordinary tool holders. The rear end of channels 21, 28 is formed by walls 31, 32, while the front of these channels is formed by walls 33, 34. Due to the different widths of channels 21, 28, walls 31, 32 are of different lengths. This is also true in the case of walls 33, 34. It should be noted that the lengths of the channels 22, 28 will be the greater, the smaller the angle at which they intersect at the tip, and the longer the channels 21, 28, the longer are the side walls 31, 32, 33, 34. It is, of course, desirable to have the side walls 31, 32, 33, 34 as large as possible in order to afford a secure support for the tools. For this reason, I propose to arrange the channels at angle of intersection of less than 90°.

The channels 21, 28 are preferably of square transverse section throughout, although they may also have rectangular or other transverse sectional shape. The bottom and top walls of each channel are preferably plane-parallel with the "top" and "bottom" surfaces of the tool holder. This is especially important when using carbide cutters, because the top surface of the carbide cutter should be plane-parallel with the top and bottom faces of the tool holder. As a result of this parallelism, the cutter and especially the carbide edge will be absolutely level when the tool holder is inserted in the tool post.

Fig. 5 shows the tool holder 30 with a ⅜ inch cutter 22' in "right hand" position.

Fig. 7 shows the tool holder 30 with a different ⅜ inch cutter 22'' in "left hand" position.

Figs. 8 and 9 show tool holder 30 with 5/16 inch cutters 35 and 35' in "left hand" and "right hand" positions, respectively.

According to the invention, the tool holders shown in Figs. 1 to 9, are provided with a transverse bore 36 for receiving a cutter such as 22'''. The cutter is secured in bore 36 by means of screw 37.

Fig. 10 illustrates cutter 22''' inserted in bore 36.

The tool holder according to the invention is further provided with a longitudinal bore 38 for receiving a cutter tool. Bore 38 may be inclined with respect to the longitudinal axis of the tool holder or it may be disposed coaxially therewith. Bore 38 is preferably provided with an aperture 39 for the discharge of shavings, etc. Screw 37 also serves for securing the cutter 22''' in bore 38. Bores 36 and 38 are preferably plane-parallel with the walls of the tool holder, which is especially important, if carbide tools are used. The cross sectional shape and size of bores 36, 38 preferably correspond to the shape and size of one of channels 21, 28.

Fig. 11 illustrates cutter 22''' inserted in bore 38 of tool holder 30.

Fig. 12 shows a modification of the tool holder tip shown in Figs. 5 to 7. According to this modification, the tip of the tool holder 30 is provided with two lateral bulges 40 which re-enforce bridge elements 29.

Figs. 13 and 14 show a further modification. According to this construction, the tip of the tool holder 30 is provided with two lateral bulges 41 having a bore through which pins 42 extend. These pins, when worn, may be easily removed and replaced by new ones.

The modifications illustrated in Figs. 12 to 14, which are somewhat more bulky at the tip of the holder, are intended for special work where some pressure will be exerted on the bridge pieces 29. Although, in the hands of a skilled operator even here little or no pressure will be directed against the bridge pieces of the holder.

Fig. 15 illustrates a tool holder tip as shown in Fig. 5, except that in this construction the bridge pieces 29 are entirely omitted. Actual tests have shown that the device according to Fig. 15 gives entirely satisfactory results when used in regular lathe work, because the pressure exerted is in outward direction as indicated by the arrow.

From the foregoing description it will be seen that the device according to this invention is a "six-in-one" tool holder. The new tool holder permits the following six possibilities; First, $\frac{3}{8}$ inch cutter—"right hand" position, Fig. 5; second, $\frac{3}{8}$ inch cutter—"left hand" position, Fig. 7; third, $\frac{5}{16}$ inch cutter—"left hand" position, Fig. 8; fourth, $\frac{5}{16}$ inch cutter—"right hand" position, Fig. 9; fifth, transverse position of cutter, Fig. 10; sixth, longitudinal position of cutter, Fig. 11. The fifth possibility calls for the transverse position of the cutter. In this case, there is again the possibility of a "right" and "left" position. Thus, the tool holder may be considered as providing even for a seventh possibility.

The special advantages of the present invention not obtained heretofore are due to the flat construction of the tool holders; the tapered tip and streamlined contour which make it possible to work the tool right close against the work piece; the use of crossing tool receiving channels; the saving of metal and reduction of weight by the use of slim bridge pieces 29 or their complete omissions; the use of set screws at the top and bottom to permit ready reversal of the tool.

Although the invention is specially intended for tool holders used in lathe-work, it may equally well be applied to shapers and planers.

I am aware of the fact that the present invention may be changed in various ways without departing from the spirit and scope of the same and I do not wish to be understood as limiting myself to the structural details shown and described herein.

I claim:

1. A combined right hand and left hand tool holder for lathe work, comprising a shank, two spaced apart jaws projecting from said shank, a wedge-shaped element projecting from said shank between said jaws, a nose rigidly and immovably connecting the front ends of said jaws, said nose having two converging walls, the latter converging in direction of said wedge-shaped element, one surface of said wedge-shaped element and one wall of said nose in conjunction with said jaws forming a first tool receiving channel, and the other surface of said wedge-shaped element and the second wall of said nose in conjunction with said jaws forming a second tool receiving channel, said two channels being of different size to accommodate tools of different sizes.

2. The device claimed in claim 1, comprising two bridge pieces separating the respective channels, each of said bridge pieces extending from one jaw to the other and forming an integral part of said jaws and locking means associated with said channels for securing a tool to the holder.

3. The device claimed in claim 1, comprising two bridge pieces extending all the way across the space between the jaws and separating the respective channels, each bridge piece forming a rigid and permanent connection between said two jaws, each jaw being provided with a bore extending to said channels, and a screw disposed in each bore for securing a tool to the tool holder.

4. A combined right hand and left hand tool holder for lathe work, comprising a substantially flat body, said body being tapered at one end, a channel extending through said body near the tapered end thereof, said channel being adapted to receive a tool, said channel being inclined with respect to the longitudinal axis of the body, the latter being traversed by a bore intersecting said channel and disposed perpendicularly to the axis thereof, said bore extending from the top face to the bottom face of said body, a pair of screws inserted in opposite ends of said bore, each screw being adapted to be turned inwardly into said bore to fasten the tool in said channel, whereby said body may be reversed for lathe operation to turn either the bottom face up or the top face up, one of said screws, in either position of the body, facing in upward direction to permit adjustment thereof from above, whereby said body presents a "right hand" as well as a "left hand" tool holder.

WILLIAM ALEXANDER BOGDEL.